United States Patent [19]

Hershfeld

[11] Patent Number: 4,532,858
[45] Date of Patent: Aug. 6, 1985

[54] APPARATUS FOR SHOWER APPLYING LIQUID SMOKE

[75] Inventor: Robert R. Hershfeld, St. Louis County, Mo.

[73] Assignee: The Baltimore Spice Company, Baltimore, Md.

[21] Appl. No.: 533,411

[22] Filed: Sep. 19, 1983

[51] Int. Cl.³ .............................................. A23B 4/00
[52] U.S. Cl. .......................................... 99/534; 17/33; 99/467; 99/483
[58] Field of Search .......... 99/467, 468, 483, 473–482, 99/516, 534; 126/25 R, 21 A, 59.5; 426/418, 302, 312, 314; 312/31, 31.1, 31.2, 236; 17/33

[56] References Cited
U.S. PATENT DOCUMENTS

| 3,255,689 | 6/1966 | Kielsmeier et al. | 99/534 |
| 3,503,760 | 3/1970 | Allen | 99/474 X |
| 3,699,877 | 10/1972 | Criss et al. | 99/534 |
| 3,790,685 | 2/1974 | Criss et al. | 17/33 |
| 3,910,175 | 10/1975 | Smith | 99/474 |
| 4,250,804 | 2/1981 | Saurenman | 99/481 X |

Primary Examiner—Timothy F. Simone
Attorney, Agent, or Firm—Paul M. Denk

[57] ABSTRACT

Apparatus for and a method of continuously showering liquid smoke to meat, fish, cheese, or other edible products are disclosed in which the edible products are placed on a chain conveyor and are automatically conveyed past a shower station at which point relatively large droplets or streams of recirculated liquid smoke are showered on the product. The products are then conveyed through a drying (and optional rinse) station and are thence conveyed to a product removal station.

15 Claims, 8 Drawing Figures

APPARATUS FOR SHOWER APPLYING LIQUID SMOKE

BACKGROUND OF THE INVENTION

This invention relates to apparatus for and to a method of smoking meat, fish, cheese, and other edible products using a shower of liquid smoke thus resulting in a faster and more efficient smoking process.

Generally, the smoking of meat products and the like has long been used for preservation and flavoring of the meat products, including link sausages, hot dogs, frankfurters, hams and the like. Smoking has long been used as a preservative, and is known to have an antibacterial effect. Additionally, smoking causes a coagulation of meat protein on the surface of the meat which results in the formation of a skin on the meat and causes a pleasing coloring and flavoring effect.

Traditionally, smoking was carried out in a smoke house in which the meat was hung from the ceiling or from racks, and a slow-burning wood fire was kept lit for a considerable period of time so as to slowly cook and to cure the meat. In prior commercial meat processing plants, wood smoke was produced by regulating the burning of selected types of moist sawdust, or by restricting the oxygen supplied to the burning sawdust. In other instances, a steel friction wheel would rub on a hardwood log so as to produce smoke by friction. It was found that heating sawdust with electric heating elements or the like resulted in a burned odor or flavor being imparted to the smoked products. In more modern commercial smoking operations, smoking apparatus was used which electrostatically precipitated the smoke particles on the meat or other edible products, one such electrostatic smoking apparatus is shown in U.S. Pat. No. 3,106,884.

Wood smoke includes three primary types of compounds, viz, acids, phenols, and carbonyls. It has been found that the acid smoke compounds accelerate curing, form the skin, and contribute a tart flavor to a smoked meat product. Further, it is believed that the phenols result in the smoked color and flavor of the meat products. Lastly, the carbonyls' major contribution is in the smokey coloring of the smoked edible products.

In more recent years, several natural wood smoke aqueous preparations, referred to generally as liquid smoke, have become commercially available and are approved by the U.S. Department of Agriculture. These liquid smoke products have been widely used to "smoke" a variety of meat, fish, cheese, and other edible products. Generally, liquid smoke is applied to the edible products either by directly mixing the liquid smoke with the edible food product (or by direct application to the interior of the casing enclosing the meat product), or by surface application as by spraying a fine mist of the liquid smoke on the exterior of the meat product. Generally, the present invention relates to a surface application method, and thus the direct mixing of the liquid smoke with the ingredients of the edible product will not herein be discussed.

Linked sausage-like products, including linked sausages, hot dogs, frankfurters and the like, are usually formed by stuffing an emulsion of ground meat, spices, and curing agents into a tubular cellulose or collagen casing. The stuffed casing is then compressed and tied-off at equal intervals so as to form a continuous linked sausage-like product. This linking operation is typically carried out on a linking machine such as is shown in U.S. Pat. Nos. 3,115,668, 3,191,222, 3,672,001, 3,694,853, 3,835,503, and 3,873,744. Such machines are commercially available from the Townsend Engineering Company of Des Moines, Iowa, under the tradename Frank-A-Matic. Such linking machines discharge a continuous line of linked sausage products which are then fed onto a chain conveyor having a plurality of spaced J-hooks with loops with the linked sausages suspended from the J-hooks generally in the manner shown in the above-mentioned U.S. Pat. No. 3,672,001. The linked sausages are then manually transferred from this J-hook conveyor to so-called trucks or cages which are then wheeled into a smoke house where either real smoke or liquid smoke is applied. After smoking, the sausages are cooked and chilled prior to being packaged. In certain instances, the smoke house may constitute one portion of a continuous sausage or hot dog processing and manufacturing system. Generally, after the sausages are smoked, cooked, and chilled, it may be necessary to peel the casing from the sausage product. This peeling operation typically is done on a high-speed sausage peeler in which the product is moistened with steam, in which the casing is split, and in which the split casing is removed from the sausage by means of a vacuum, mechanical means, or by compressed air. Because the casing is oftentimes discarded after processing, it is advantageous to utilize the least expensive casings, which are generally cellulose casings. Thus, it is desirable to form a "skin" on the meat product surface below the casing.

Smoke houses utilizing so-called surface-applied liquid smoke processing methods typically utilize a very fine mist or cloud of the liquid smoke which is sprayed on the sausages within the smoke house. Such a misting liquid smoke application method is disclosed in U.S. Pat. No. 3,503,760. While such a misting liquid smoke method worked well for its intended purposes, the atomization of the liquid smoke, using very fine droplets of about 150 microns or less so as to form a cloud of the liquid smoke within the smoke house, required that the edible meat products or the like be moved into the smoke house in batches, the doors of the smoke house closed, the cloud of liquid smoke generated and forcefully circulated over the meat products. However, several minutes were required to atomize the liquid smoke and to fill the smoke house with a cloud of liquid smoke. Then, before the meat products could be removed from the smoke house, it was necessary that the circulation fans within the smoke house be shut off for about 25–30 minutes so as to permit settling of the cloud of liquid smoke before the meat products could be removed from the smoke house. The requirement of batch smoking operations and the necessity of having to shut the fans off for as long as 25 minutes before one completed batch could be exchanged for a batch to be smoked, resulted in inefficiencies of the smoking process and, in some instances, created a bottleneck in the processing of meat products.

Also, since liquid smoke is corrosive, any of the liquid smoke mist escaping from the apparatus must be entrapped by liquid smoke collection apparatus. Further, any materials which come into contact with or are likely to come into contact with the liquid smoke mist must be made of suitable corrosion-resistant materials, such as stainless steel, ceramics or the like. In many instances, however, it was not possible to prevent escaping mist from coming into contact with adjacent equipment, and thus corrosion of the adjacent equipment was experienced.

SUMMARY OF THE INVENTION

Among the several objects and features of the present invention may be noted the provision of apparatus for and a method of applying liquid smoke to meat and other edible products by means of a direct shower of directed droplets of relatively large size so as to substantially reduce the time required for the liquid smoke to penetrate the casing of the edible product, and so as to coagulate the surface protein of a meat product thereby to form a skin within the casing.

The provision of such apparatus and method which permits the use of less expensive, regular type cellulose casings (as compared to more expensive "easy peel"-type casings) and yet allows excellent peelability of the casing.

The provision of such apparatus and method which permits the use of collagen casings.

The provision of such apparatus and method which increases the through-put capability of linked sausage-like product lines.

The provision of such apparatus and method in which the likelihood of corrosive liquid smoke contact with unprotected surfaces is reduced.

The provision of such apparatus and method in which surface bacteria on the meat product is more effectively killed thus significantly extending shelf life of the meat products for up to two or more weeks.

The provision of such apparatus which is generally synchronized to the output of a sausage linking apparatus such that the linked product is continuously conveyed into the smoke house section of the process and such that the through-put of the smoking operation is the same as the output of the linking apparatus.

The provision of such apparatus which is easy to load and unload.

The provision of such apparatus and method which effectively utilizes liquid smoke and which results in lower consumption of liquid smoke.

The provision of such apparatus and method which may incorporate optional cooking and rinsing steps.

The provision of such apparatus and method which is of low-cost investment, which is of a high operational speed, which is energy efficient, which has a long service life, and which is reliable in operation.

Other objects and features of this invention will be in part apparent and in part pointed out hereinafter.

Briefly stated, apparatus of the present invention for the surface application of liquid smoke to an edible article, such as a link sausage product, cheese, other meat product, or the like, comprises a conveyor which is movable along a predetermined path from a loading station into a liquid smoke shower station and thence to a drying chamber and thence to an unloading station. The liquid smoke shower station has a chamber enclosing a portion of the conveyor with the edible articles thereon. A reservoir at the bottom of the chamber holds a supply of the liquid smoke and a plurality of shower nozzles is positioned so as to spray liquid smoke on the edible articles carried by the conveyor to the chamber. A pump draws the liquid smoke from the reservoir and showers the liquid smoke from the shower nozzles in relatively large droplets (or in a substantially continuous liquid stream) onto the edible articles with the excess liquid smoke rapidly falling into the reservoir therebelow. Optionally, the recirculated shower of liquid smoke may be heated to an elevated level.

The method of this invention of applying liquid smoke to a plurality of edible articles generally comprises the steps of conveying the edible articles to a liquid smoke shower station and directing a shower of an aqueous liquid smoke solution onto the edible articles with the droplets or streams comprising the liquid smoke shower being of an average diameter in excess of 1,000 microns so as to be substantially incapable of forming a mist suspended within the air within the spraying station, and so as to facilitate the rapid fall-by-gravity of the liquid smoke droplets to the bottom of the spraying station. Then, the edible articles are conveyed clear of the spraying station so as to permit excess liquid smoke to be drained therefrom and so as to permit at least partial drying of the surface of the edible articles.

BRIEF DESCRIPTION OF THE DRAWINGS

Corresponding reference characters indicate corresponding parts throughout the several views of the drawings.

DESCRIPTION OF THE PREFERRED EMBODIMENTS

Figure 1:
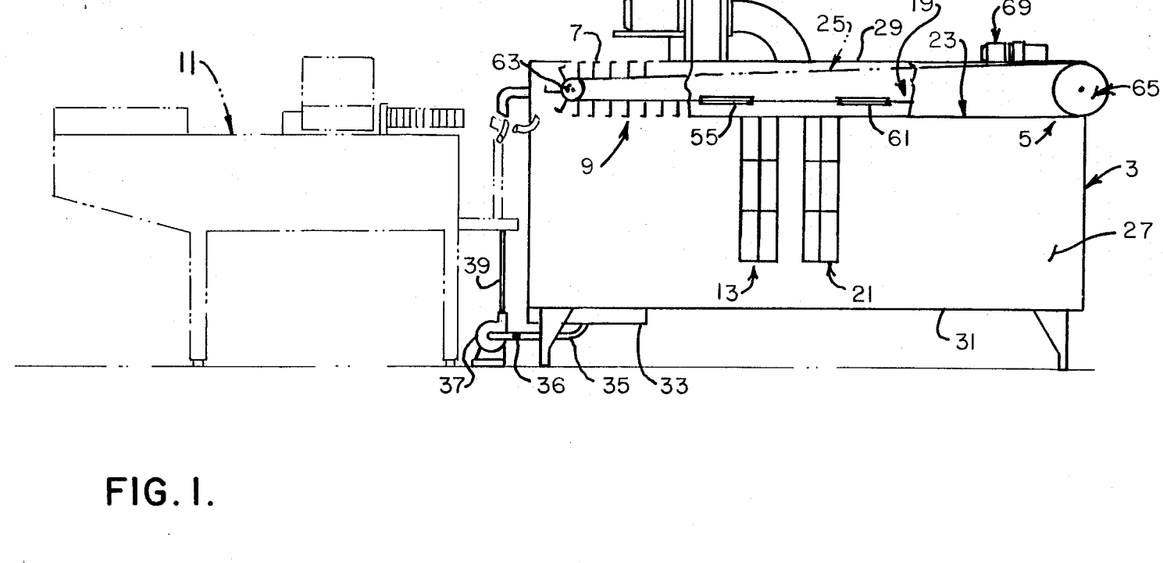
FIG. 1 is a side elevational view of liquid smoke applying apparatus of the present invention (shown in solid lines) and of a continuous sausage linking machine (shown in phantom) in which the sausage links dispensed from the linking machine are loaded onto a chain conveyor of the smoking apparatus of the present invention at a loading station.
Figure 2:
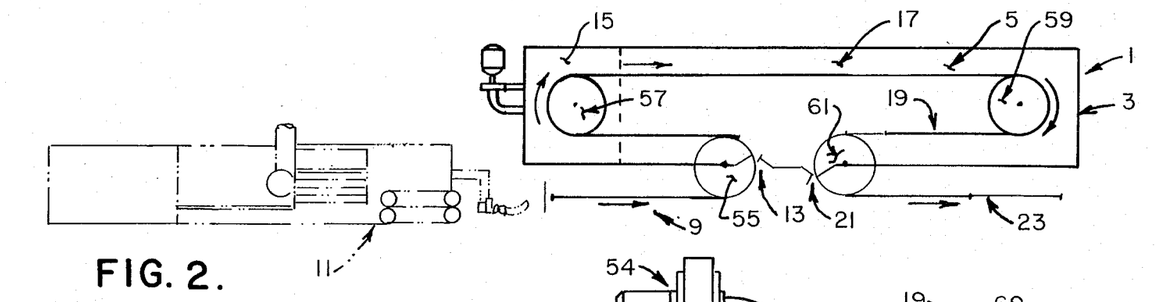
FIG. 2 is a top plan view of FIG. 1.

Referring now to the drawings, liquid smoke showering apparatus of the present invention is indicated in its entirety by reference character 1 and is shown in solid lines in FIGS. 1 and 2. More specifically, liquid smoke showering apparatus 1 comprises an enclosed cabinet 3 of suitable corrosion resistant material, such as stainless steel or the like. An endless conveyor 5 is entrained around a plurality of pulleys (as will be hereinafter discussed in detail) so as to convey edible articles to be smoked (e.g., linked sausage products, hot dogs, chicken, fish, cheese, or other food products) along a predetermined path through the apparatus 1. Conveyor 5 includes a plurality of spaced J-hooks 7 from which the edible articles are supported. More particularly, the conveyor path includes a loading station 9 at which, for example, continuously linked sausage products output from a sausage linking machine 11 (shown in phantom) may be loaded in loops onto J-hooks 7 of conveyor 5. From the loading station, conveyor 5 passes through an entrance door 13 into cabinet 3 and enters a so-called shower station within the cabinet, as generally indicated at 15. As will be hereinafter explained in detail, a shower of liquid smoke droplets or continuous streams of an aqueous solution of liquid smoke is sprayed on the edible articles suspended from J-hooks 7 within the shower station. The edible products are then conveyed from the shower station 15 into a drying station 17 which may include an optional spray rinse station 19. The edible articles are then conveyed out of cabinet 3 via an outlet door 21 to an unloading station 23 at which point the smoked edible articles may be unloaded from the conveyor 5. The conveyor further includes a return reach 25 so as to complete the endless conveyor path.

Turning now to a more detailed construction of cabinet 3, the cabinet includes vertical cabinet walls 27, a cabinet roof 29, and a cabinet floor 31. Cabinet 3 may be supported by suitable legs above the floor. A liquid smoke reservoir or sump 33 is provided at the base of shower station 15 such that excess aqueous liquid smoke solution is collected in the reservoir and is drawn via a suction pipe to a recirculating pump 37. An optional heater 36 may be provided in suction line 35 so as to heat the aqueous liquid smoke solution to a predetermined temperature level (e.g., 120° F.) to facilitate a more rapid absorption of the liquid smoke by the edible articles being smoked, to at least partially cure or cook the edible products and to enhance the antimicrobial effects of the smoking operation on the edible products. The pressurized liquid smoke solution is fed from the pump 37 by a pressure feed line to a plurality of shower heads 41 located within shower station 15. Shower heads 41 are arranged so as to direct streams of discrete aqueous liquid smoke droplets (or continuous streams of aqueous liquid smoke) onto the edible articles carried by conveyor 5 within shower station 15 so as to directly contact substantially all surfaces of the edible articles with liquid aqueous liquid smoke solution. For example, six flood jet shower nozzles 41 may be provided within shower station 15 and located above and below the level of conveyor 5 within the shower station.

In accordance with this invention, shower heads 41 dispense a plurality of discrete droplets of aqueous liquid smoke solution or a steady stream of liquid aqueous smoke, and direct the stream of droplets or liquid onto the edible articles. The droplets of aqueous liquid smoke solution formed by shower heads 41 are of relatively large diameter such that the majority of the liquid smoke remains in liquid form and is not atomized by the spraying head such that the liquid directly contacts the edible articles and drains therefrom in liquid form so as to accumulate within sump 33. Preferably, the minimum size of the droplets formed by shower heads 41 are of a diameter larger than about 1,000 microns. Even larger minimum size droplets may be preferable. In accordance with this invention, the size of the droplets should be greater than the minimum size required to result in a suspension of atomized liquid smoke particles within shower station 15, which size may vary depending on the liquid smoke used, the degree of dilution with water, ambient conditions, and other factors.

Preferably, but not necessarily, a dividing wall 43 is provided within cabinet 3 dividing shower station 15 from drying station 17. Dividing wall 43 is provided with an entrance door and screen 45 permitting conveyor 5 with the edible articles suspended from the downwardly extending J-hooks 7 thereon to pass through the entrance door and screen into shower station 15. For example, the screen provided across the entrance door may be a plurality of polyethylene splash guard shields (no shown) which permit the conveyor to pass through the entrance opening, but which effectively aids in preventing droplets or streams of the aqueous liquid smoke solutions emitted from shower heads 41 from entering the drying station 17. Likewise, dividing wall 43 includes an exit door 47 and shield assembly similar to entrance door 45 so as to permit the conveyor and edible articles thereon to exit shower station 15.

Figure 3:
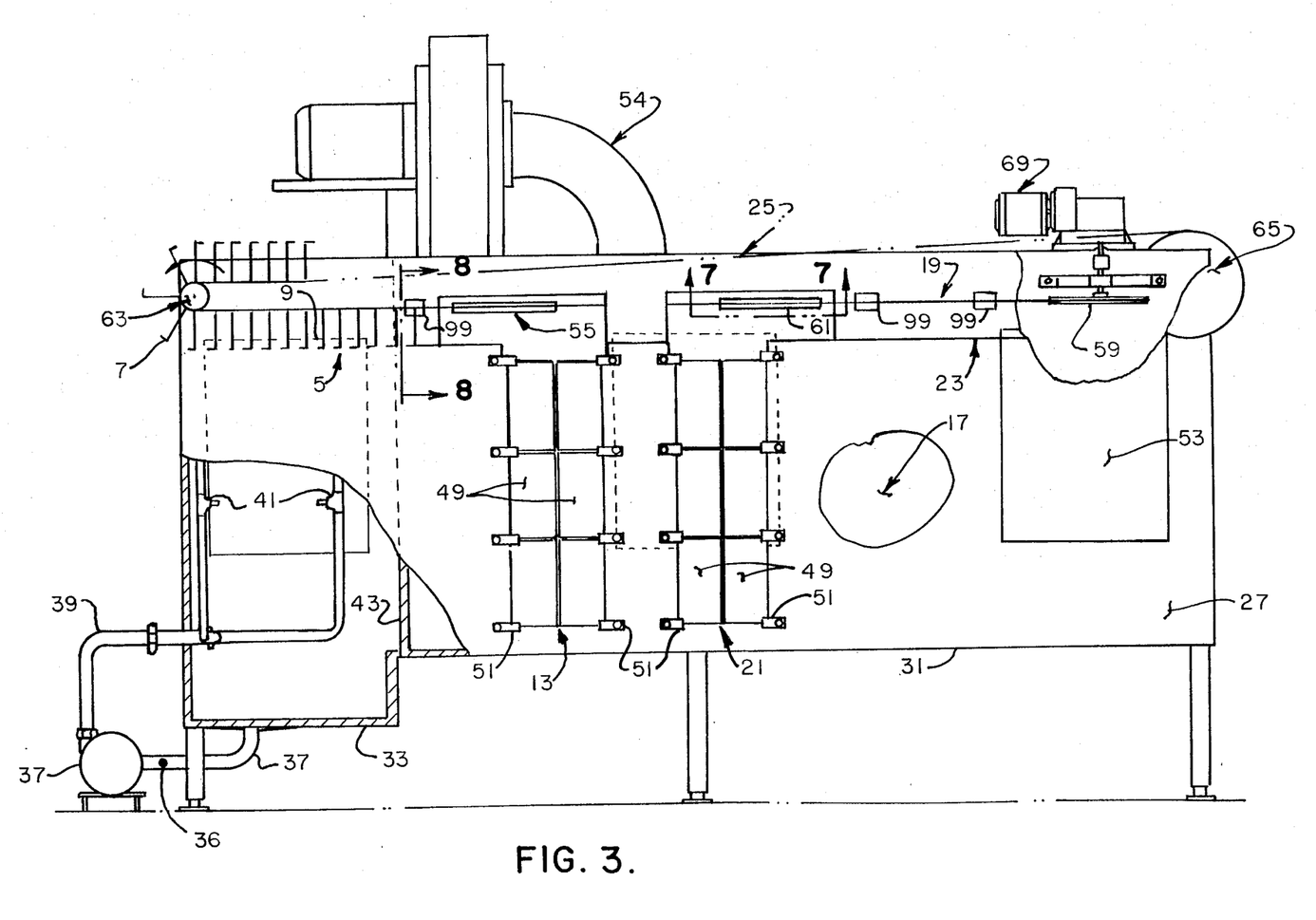
FIG. 3 is a side elevational view of a smoking apparatus of the present invention on an enlarged scale with portions of the cabinet of the apparatus broken away for purposes of clarity.
Figure 4:
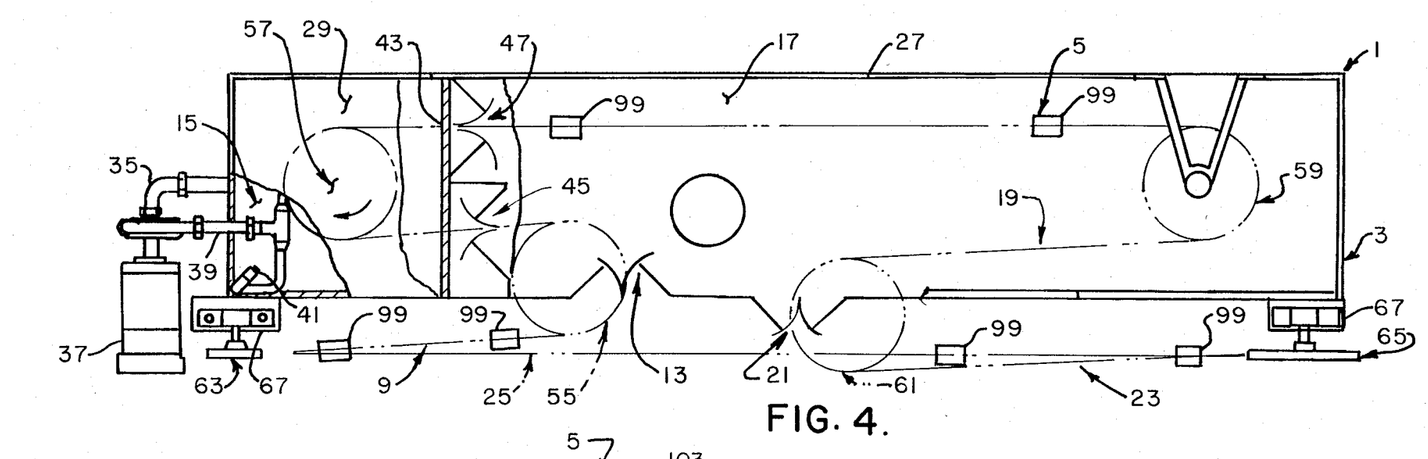
FIG. 4 is a top plan view of FIG. 3 with the air exhaust fan and with the drive motor for the conveyor omitted, and with portions of the top panel of the cabinet broken away to illustrate details of construction.
Figure 5:
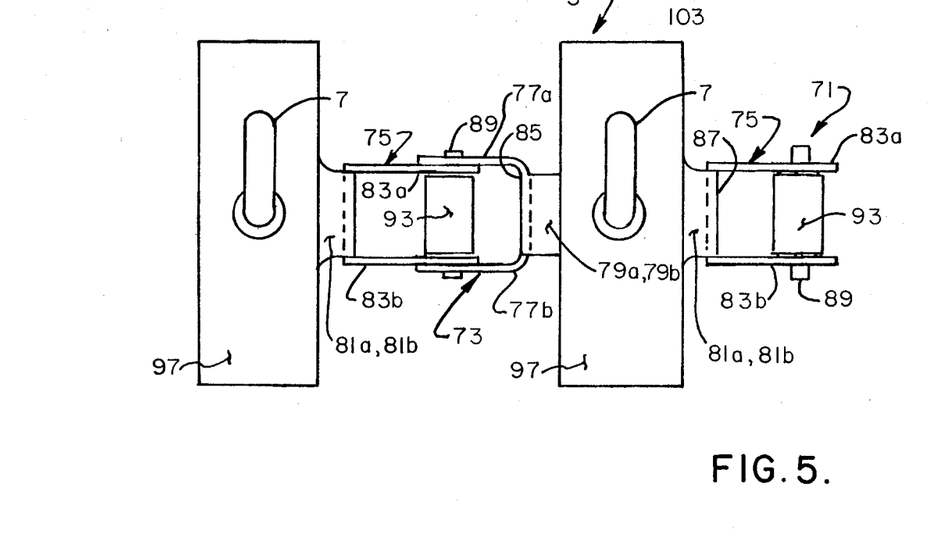
FIG. 5 is a bottom plan view of the conveyor chain of the present invention having a plurality of spaced J-shaped hooks from which the edible products are hung with this conveyor traveling around an endless conveyor path and trained on horizontal and on vertically disposed sprockets.

As best shown in FIG. 3, entrance door 13 and outlet door 21 are comprised by a plurality of independently hinged door panels 49 which are normally biased toward their closed position (as shown in FIG. 3) and which are hingedly attached to cabinet walls 27 by means of self-closing hinges 51. As best shown in FIG. 4, entrance door 13 swings inwardly and outlet door 21 swings outwardly relative to the cabinet such that the edible articles suspended from J-hooks 5 exert sufficient pressure on the door panels 49 so as to automatically open the door panels as the edible articles on the conveyor are conveyed through the doors. It will be appreciated that if edible articles are not loaded on conveyor 5 at the loading station such that a gap of empty conveyor is present, the door panels will automatically return to their closed positions thus resulting in entrapping as much of the liquid smoke emissions or vapor as possible within cabinet 3. And yet, upon product being loaded onto the conveyor, the product will automatically open the doors as it contacts the doors. Additionally, with each of the doors 13 and 21 being of a plurality of independently movable panels or segments (three such door segments are shown in FIG. 3), only such upper segments of the doors as are required will be open as the product is conveyed therethrough. It will be understood that if relatively short length products, such as cheese or the like, is conveyed by the conveyor, possibly only the upper door segments will be opened. On the other hand, in the event long hams or long loops of frankfurters are conveyed through the doors, the upper two or even all of the doors segments 49 will be caused to be opened. Further, an access door 53 is provided in the side wall 27 of cabinet 3 so as to provide access to various portions of cabinet 3 so as to facilitate cleaning and so as to permit access to various reaches of the conveyor. An exhaust fan 54 is mounted on top of cabinet 3 so as to maintain a slightly negative pressure within the cabinet thereby to ensure that any liquid smoke droplets or odors are maintained within the cabinet. The discharge from fan 54 may be into an appropriate vent or into an absorbing unit (not shown).

In accordance with this invention, conveyor 5 is shown to be an endless chain conveyor entrained around a plurality of sprockets including horizontal sprockets which are rotatable about vertical axes and vertical sprockets which are rotatable about horizontal sprockets. More particularly, conveyor 5 comprises a first horizontal sprocket 55 journaled relative to cabinet 3 adjacent entrance door 13. A second horizontal sprocket 57 is journaled relative to the cabinet within shower station 15. A third horizontal sprocket is rotatably mounted within drying chamber 17 distal from shower chamber 15. A fourth horizontal sprocket is journaled relative to the cabinet adjacent exit door 21. Still further, a first vertical sprocket is positioned adjacent shower station 15 and a second vertical sprocket 65 is positioned on the side of the cabinet distal from the first vertical sprocket. Thus, endless chain conveyor 5 extends from the first vertical sprocket 63 to the first horizontal sprocket 55 with the loading station 9 being therebetween. It will be appreciated that as the chain is entrained around the first, relatively small diameter sprocket 63, the J-hooks 7 are spread apart in radial direction a considerable space so as to enable the linked product from the linking machine 11 to be easily loaded on the conveyor 5. The conveyor between the first vertical sprocket 63 and the second vertical sprocket 65 (i.e., as the chain conveyor is conveyed around sprockets 55-61) is disposed with its J-hook 7 directed downwardly such that the edible products may be suspended therefrom. Then, as the chain conveyor is entrained around the second vertical sprocket 65 the J-hooks are inverted such that during the return run 25 of the conveyor, the J-hooks are directed upwardly as best shown in FIG. 3. Each of the sprockets 55-65 are journaled in a suitable bearing 67 supported by cabinet 3. Horizontal sprocket 59 is positively driven by means of an electric gear motor 69 so as to drive conveyor 5 around its above-described endless path and may be adjusted so as to remain under proper tension. By varying the speed of motor 69, the speed at which the products are conveyed through smoke chamber 15 and hence the smoking time of the apparatus may be controlled. Further, the speed of motor 69 may be varied so as to synchronize the speed of the conveyor with the discharge rate of linking machine 11.

More specifically, conveyor 5 comprises a chain 71 which consists of alternating first double U-shaped links or yokes 73 and second double U-shaped yokes or links 75 pinned together (in a manner as will appear) so as to rotate relative to one another about alternating perpendicular axes thereby permitting the chain to be wrapped around horizontal sprockets 55-61 and around vertical sprockets 63 and 65. More specifically, the first double U-shaped yoke 73 includes a first pair of side plates, as indicated at 77a, 77b and a second pair of side plates 79a, 79b with these side plates being disposed mutually perpendicular to one another. Likewise, the second double U-shaped yoke 75 comprises a first pair of spaced side plates 81a, 81b and a second pair of side plates 83a, 83b which are mutually perpendicular to the first pair of side plates. Yoke 73 includes a common base 85 interconnecting side plates 77a, 77b and 79a, 79b. Likewise, yoke 75 includes a common base 87 interconnecting its respective side plates 81a, 81b and 83a, 83b.

Figure 6:
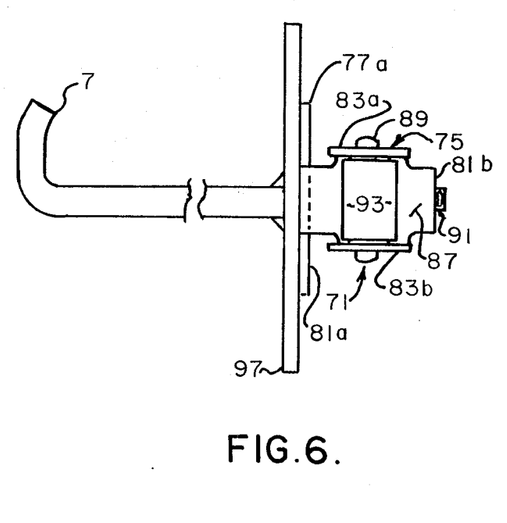
FIG. 6 is a right elevational view of the conveyor chain shown in FIG. 6.
Figures 7, 8:
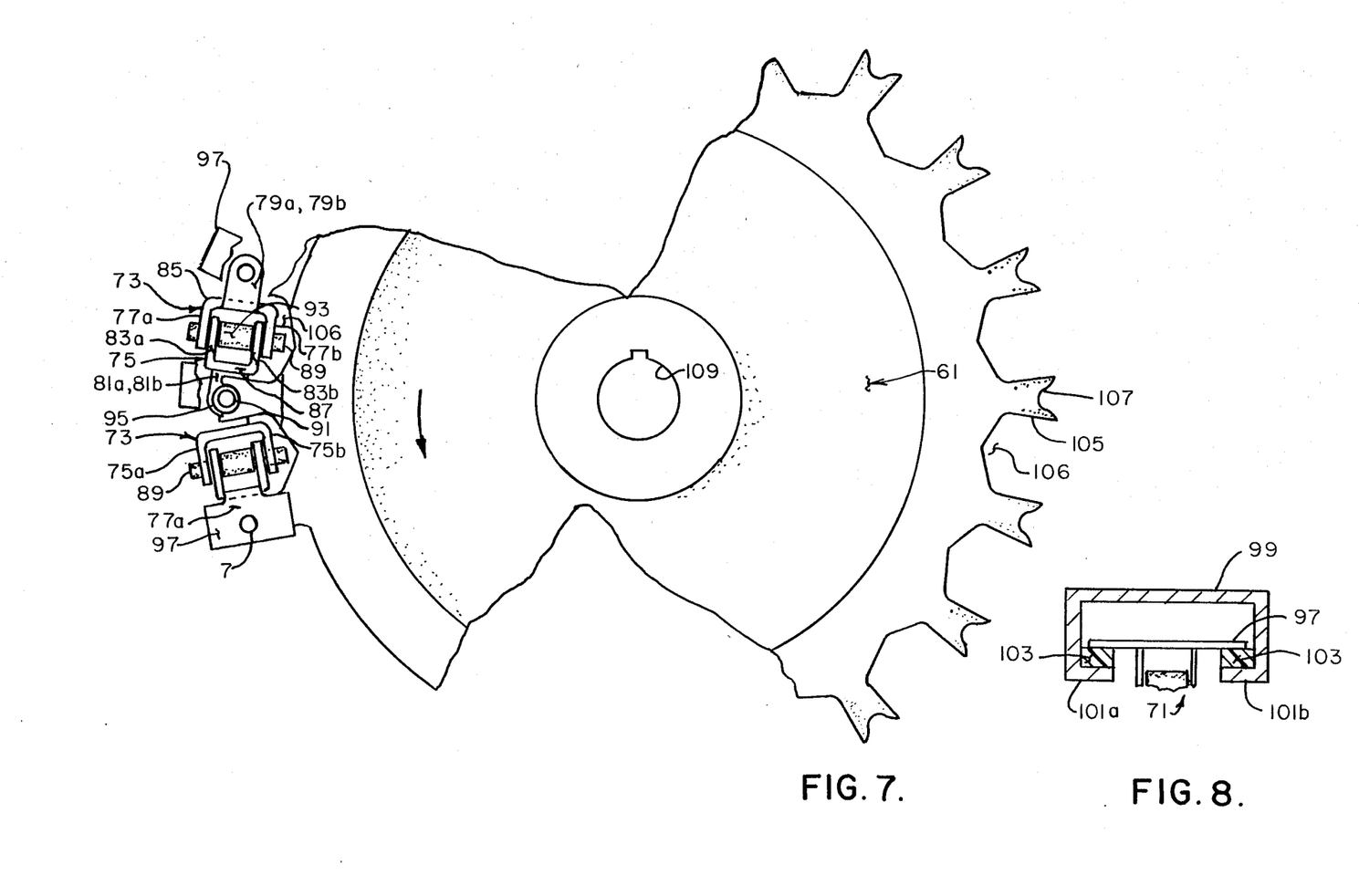
FIG. 7 is a cross sectional view taken along line 7—7 of FIG. 3 illustrating a typical sprocket wheel for the conveyor chain of the present invention.
FIG. 8 is an enlarged view taken along line 8—8 of FIG. 3 showing a support for the chain conveyor.

As heretofore stated, chain link yokes 73 and 75 alternate with one another and each of the yokes has holes provided in its respective side plates such that a horizontal pin (as shown in FIG. 7) 89 interconnects the side plates 77a, 77b of a link 73 to the side plates 83a, 83b of link 75 so as to permit vertical (as shown in FIG. 6) pivoting movement of the links 73 and 75 relative to one another about the horizontal pin 89. Likewise, a vertically disposed pin 91 is provided so as to pivotally interconnect the side links 79a, 79b of link 73 to the corresponding side links 81a, 81b of the next adjacent link 75 so as to permit relative horizontal rotation of the links 73 and 75 relative to one another. Pin 89 is surrounded by a bushing 93 and pin 91 is surrounded by a respective bushing 95.

Conveyor 5 further includes a plurality of conveyor plates 97 welded to the side plate 81a of each link 75 such that the conveyor plates face generally downwardly as the conveyor extends from the bottom of the first vertical sprockets 63 around horizontal sprockets 55-61 to the bottom of the second vertical sprocket 65. More specifically, conveyor plates 97 pass through inverted channel-shaped conveyor supports 99 carried by cabinet 3 at spaced intervals along the path of conveyor 5. These conveyor supports 99 have inwardly extending fingers 101a, 101b having TFE plastic pads 103 thereon slidably engageable by plates 97 on conveyor chain 71, so as to support the conveyor between the sprockets.

Referring now to FIG. 7, a typical sprocket is shown which engages either bushings 93 for pins 89 or bushings 95 for pins 91, depending on whether the sprocket is a horizontally disposed sprocket 55-61 or a vertically disposed sprocket 63 or 65. Generally, the sprocket includes a plurality of sprocket teeth 105 spaced at equal angular intervals around the sprocket with spaces 106 between the adjacent teeth 105. Each of the sprocket teeth 105 has a notch 107 in its outer end engagable with a respective pin 91 or 89, whichever is disposed to be generally parallel to the axis of the sprocket. As shown in FIG. 7, the sprocket illustrated therein is horizontal sprocket 61 such that sprocket teeth 105 engage the vertically disposed bushings 95 on pins 91. Further, as shown in FIG. 7, gaps 106 between adjacent sprocket teeth 105 are of such size as to accomodate the portions of chain 71 between the adjacent vertical pins 91 as the chain 71 is wrapped around the sprocket wheel. Those skilled in the art will appreciate that if the sprocket wheel is a vertical sprocket 63 or 65, sprocket teeth 105 will engage the horizontally disposed bushings 93 on pins 89 and the portions of the chain including the vertically disposed pins 91 will be received in openings 106 between sprocket teeth 105. In this manner, the chain may be entrained around both horizontal and vertically disposed sprocket wheels. Additionally, the sprocket illustrated in FIG. 6 is shown to have a concentric central opening 109 which may be keyed or otherwise fixed to a respective shaft or axle mounting the sprocket wheel to its respective bearing assembly 67.

In operation, drive motor 69 for conveyor 5 is operated at a speed comensurate with the speed at which product is delivered to loading station 9 from linking machine 11 (shown in phantom). For example, linked sausage-like edible articles may be discharged from linking machine 11 at a rate of 2000-2300 pounds/hour (909-1044 kg./hour). Additionally, such a machine may form 20,000-23,000 links/hour. The connected links are looped onto J-hooks 7 of conveyor 5 at the loading station as they ar discharged from linking machine 11 and the linked sausages are conveyed around the first horizontal sprocket 55 through entrance door 13 into cabinet 3. Thence, the linked sausage products are conveyed through door 45 into shower station 15 at which point they are drenched by a spray of liquid aqueous smoke solution from substantially all sides and in all directions so as to totally wet the edible products carried by the conveyor. Excess liquid smoke drains from the edible products and from the side walls of cabinet 3 defining shower station 15 and accumulates in sump 33. Pump 37 recirculates the liquid smoke solution over incoming products and over the product remaining within the shower station. Of course, while the aqueous liquid smoke solution is recirculated from sump 33 to shower heads 41, additional liquid smoke must be added to the sump because a certain quantity of the liquid smoke is absorbed by the meat product. It has been found that one gallon of liquid smoke, such as ZESTISMOKE commercially available from Hickory Specialties Company of Crossville, Tennessee, will effectively treat 1,600 pounds (726 kg.) of hot dogs.

As the treated edible articles exit shower chamber 17 via exit door 47, they enter drying station 15 at which point excess liquid smoke may drain or drip from the conveyor and from the edible articles onto the cabinet floor 31. It will be appreciated that cabinet floor 31 may be inclined downwardly toward reservoir 33 such that excess liquid smoke will be returned from the drying chamber to the shower chamber for recirculation by pump 37. An optional water rinse station 19 (not shown in detail) may be provided within drying station 17 so as to wash any excess liquid smoke from the surface of the edible product. Generally, this optional rinsing station may include water spray heads which emit a fine mist of water to moisten the products and to wash off any acetic acid resulting from the smoking operation on the edible products. Then, the conveyor 3 is entrained around the fourth horizontal sprocket wheel 61 and the smoked articles emerge from cabinet 3 via exit door 21 and are conveyed to unloading station 23 at which point they are unloaded from the J-hook conveyors where the smoked edible articles may be transferred to trucks or cages in a conventional manner for additional handling or processing within the meat packing plant prior to packaging.

In view of the above, it will be seen that the other objects of this invention are achieved and other advantageous results obtained.

As various changes could be made in the above constructions or methods without departing from the scope of the invention, it is intended that all matter contained in the above description or shown in the accompanying drawing shall be interpreted as illustrative and not in a limiting sense.

What is claimed is:

1. Apparatus for the surface application of liquid smoke to edible articles, said apparatus comprising a conveyor movable along a path from a loading station into a smoke shower station, to a drying station, and thence to an unloading station, comprising, said apparatus including the liquid smoke shower station and having a chamber at least partially enclosing a portion of said conveyor with said edible articles thereon, a reservoir for the apparatus and holding a supply of liquid smoke, a plurality of shower nozzles operatively associated with the apparatus and positioned so as to spray liquid smoke on said edible articles carried by said conveyor within said chamber, a pump operatively associated with the apparatus and useful for drawing liquid smoke from said reservoir and for spraying said liquid smoke from said shower nozzles in large, discrete droplets or in a substantially continuous liquid stream onto said edible articles with the excess liquid smoke returning to said reservoir, said apparatus incorporating a cabinet having an inlet door for said conveyor and an outlet door for said conveyor, said conveyor being of the endless chain type and having a plurality of support means thereon from which the edible articles may be suspended, and said chain being entrained around a plurality of sprockets including a series of said sprockets maintained within the cabinet for movement of the endless chain therethrough, and a plurality of said sprockets being located exteriorly of said cabinet for support and movement of the endless chain along its predetermined path and to accommodate the loading and unloading of edible articles thereon.

2. Apparatus as set forth in claim 1 further comprising a rinsing station downstream from said liquid smoke shower station at which point rinsing water is sprayed on said edible articles so as to rinse excess liquid smoke therefrom.

3. Apparatus as set forth in claim 1 wherein said liquid smoke shower station chamber has an inlet and an outlet including means for permitting said conveyor with said edible articles thereon to enter and exit said chamber and for effectively preventing excess liquid smoke spray from splashing out of said chamber.

4. Apparatus as set forth in claim 1 wherein said drying station includes a fan for exhausting air therefrom thereby to create a negative pressure within said cabinet thereby to prevent the escape of liquid smoke fumes therefrom.

5. Apparatus as set forth in claim 1 wherein said liquid smoke chamber includes means for heating said liquid smoke.

6. Apparatus as set forth in claim 5 wherein said heating means is an emersion heater installed within said liquid smoke line supplying said shower nozzles.

7. The invention of claim 1 and wherein said series of sprockets include a first horizontal sprocket adjacent said inlet door, a second horizontal sprocket within said liquid smoke spray chamber, a third horizontal sprocket within said drying chamber, and a fourth horizontal sprocket adjacent said outlet door, and fifth and sixth sprockets on the exterior of said cabinet with said fifth and sixth sprockets being vertically disposed and rotatable about their respective horizontal axes.

8. Apparatus for the surface application of liquid smoke to edible articles, said apparatus being of the type incorporating a conveyor movable along a path from a loading station into a smoke shower station, to a drying station, and thence to an unloading station, comprising, said apparatus including said liquid smoke shower station, said shower station having a chamber at least partially enclosing a portion of said conveyor with said edible articles thereon, a reservoir operatively associated with the appartus for holding a supply of liquid smoke, a plurality of shower nozzles provided within the apparatus and positioned so as to spray liquid smoke on said edible articles carried by said conveyor within said chamber, a pump operatively associated with the apparatus and for drawing liquid smoke from said reservoir and for spraying said liquid smoke from said shower nozzles in large, discrete droplets or in a substantially continuous liquid stream onto said edible articles with the excess liquid smoke returning to said reservoir, said chamber including a cabinet having an inlet door for said conveyor and an outlet door for said conveyor, wherein said conveyor is of an endless chain type having a plurality of support means thereon from which said edible articles may be suspended, said chain being entrained around a plurality of sprockets including a first horizontal sprocket adjacent said inlet door, a second horizontal sprocket within said liquid smoke spray chamber, a third horizontal sprocket within said drying chamber, and a fourth horizontal sprocket adjacent said outlet door, and fifth and sixth sprockes on the exterior of said cabinet with said fifth and sixth sprockets being vertically disposed and rotatable about their respective horizontal axes.

9. Apparatus as set forth in claim 8 wherein said loading station is between said first horizontal sprocket and one of said vertical sprockets.

10. Apparatus as set forth in claim 8 wherein said unloading station is between said fourth horizontal sprocket and the other of said vertical sprockets.

11. Apparatus as set forth in claim 8 wherein said chain is pivotal about alternating perpendicular axes thereby to facilitate a transition between said horizontal sprockets and said vertical sprockets.

12. Apparatus as set forth in claim 11 wherein said chain comprises a plurality of links with each of said links having a pair of double U-shaped brackets generally perpendicular relative to one another, each of said U-shaped brackets having a pin therethrough and a bushing on said pin for joining the bracket of one link with a respective bracket on a next adjacent link.

13. Apparatus as set forth in claim 12 further comprising a plate secured to one of the faces of one of the U-shaped links.

14. The invention of claim 13 and wherein said support means comprises a plurality of J-hooks suspended from the endless chain of the conveyor.

15. Apparatus as set forth in claim 14 wherein each of said plates carries one of said J-hooks.

* * * * *